United States Patent [19]

May

[11] Patent Number: 5,382,799

[45] Date of Patent: Jan. 17, 1995

[54] ULTRAVIOLET INTENSITY METER

[75] Inventor: Joe T. May, Leesburg, Va.

[73] Assignee: Electronic Instrumentation and Technology, Inc., Sterling, Va.

[21] Appl. No.: 170,083

[22] Filed: Dec. 14, 1993

[51] Int. Cl.$^6$ .............................................. G01J 1/00
[52] U.S. Cl. ......................................................... 250/372
[58] Field of Search ........................................ 250/372

[56] References Cited

U.S. PATENT DOCUMENTS

| | | |
|---|---|---|
| 3,662,175 | 5/1972 | Davidson et al. . |
| 3,851,970 | 12/1974 | Adler et al. . |
| 3,971,943 | 7/1976 | Jeunehomme et al. . |
| 4,165,463 | 8/1979 | Bowen . |
| 4,201,916 | 5/1980 | Ellner . |
| 4,428,050 | 1/1984 | Pelligrind et al. .............. 250/372 |
| 4,535,244 | 8/1985 | Burnham ........................ 250/372 |
| 4,629,896 | 12/1986 | Bridgen . |
| 4,851,685 | 7/1989 | Dübgen ........................... 250/372 |
| 4,962,910 | 10/1990 | Shimizu ........................... 250/372 |
| 4,985,632 | 1/1991 | Bianco et al. .................... 250/372 |
| 5,107,123 | 4/1992 | Shi ................................... 250/372 |
| 5,151,600 | 9/1992 | Black .............................. 250/372 |
| 5,218,416 | 6/1993 | Haring et al. . |

Primary Examiner—Constantine Hannaher
Assistant Examiner—Edward J. Glick
Attorney, Agent, or Firm—Whitham, Curtis, Whitham & McGinn

[57] ABSTRACT

A self-contained, electro-optic instrument measures and displays the intensity emitted by an ultraviolet (UV) light source. The instrument is a portable, battery-operated device which has the size and shape of a flashlight. The measurement head receives various light guide adapters to provide a proper fit for a light guide of the UV spot curing system being used. Alternatively, the measurement head may be fitted with a wide angle lens to receive UV light for environment safety testing. In operation with a spot curing system, the instrument is gripped in one hand while the light guide is inserted in the adapter in the measurement head with the other hand. Once the spot curing system's light guide is inserted, a start switch on the body of the instrument is depressed and a measurement is taken. When the start switch is released, the measurement temporarily stored and displayed on a display, such as a liquid crystal display (LCD). Operation is similar for environmental safety testing except the instrument is simply pointed in a direction where the UV light is to be measured.

16 Claims, 4 Drawing Sheets

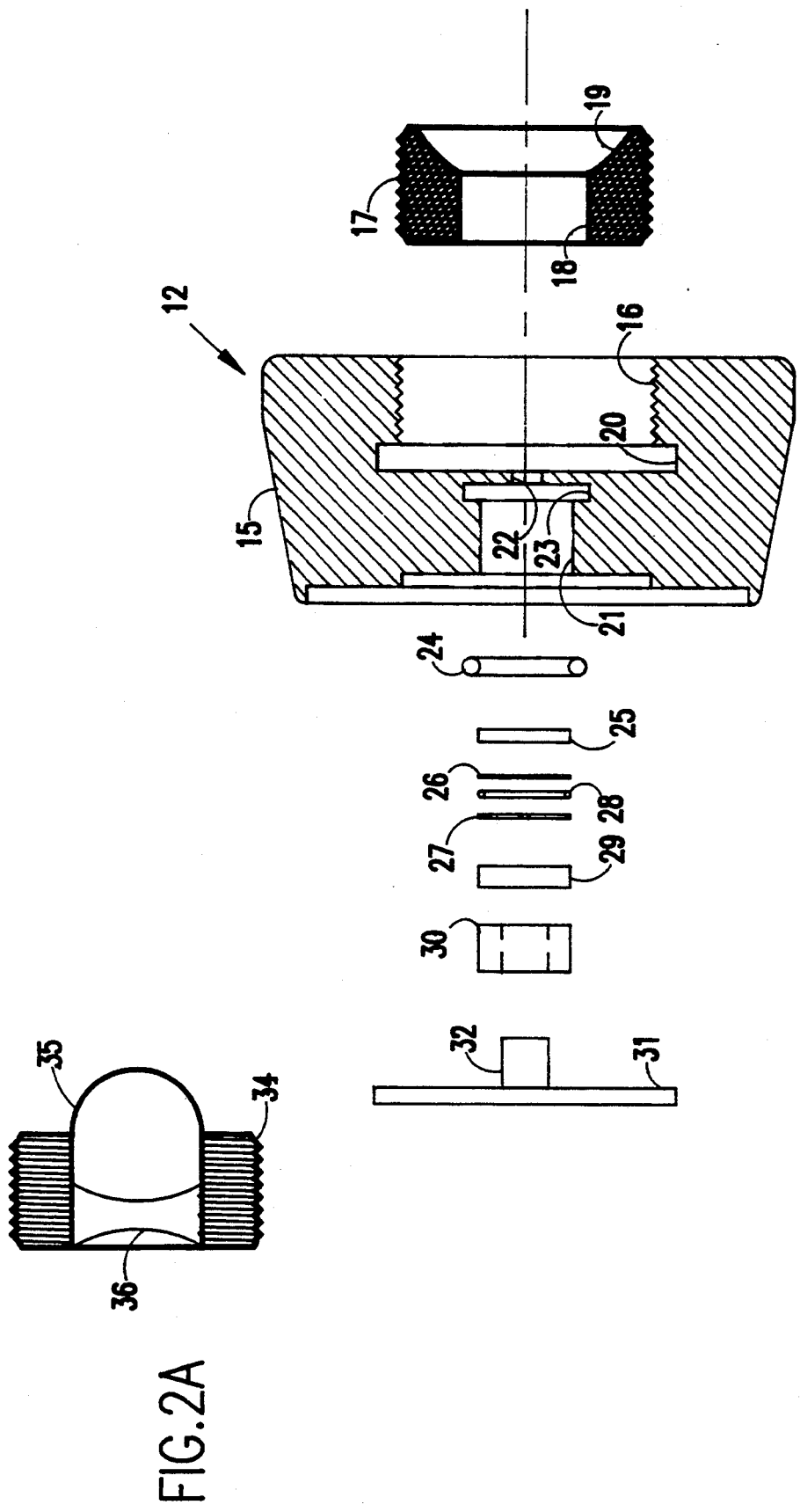

ULTRAVIOLET INTENSITY METER

BACKGROUND OF THE INVENTION

1. Field of the Invention

The present invention generally relates to instrumentation for taking measurements of the level of ultraviolet (UV) energy and, more particularly, to a portable UV intensity meter for measuring and displaying the intensity emitted by a UV light sources including, but not limited to, UV light sources used in spot curing systems.

2. Description of the Prior Art

There are many substances, known as monomers, which can be converted to polymers by chemical reactions. In some cases, these reactions are induced by chemical catalysts and initiators. However, polymerization can also be induced by supplying the initiation energy with visible or ultraviolet (UV) light. Such photochemical reactions have practical as well as theoretical advantages. For example, in certain manufacturing processes, a polymer may be used to secure parts of an assembly. In the field of fiber optics, splices and repairs are often made in the field using a polymer. In both of these examples, the photochemically induced polymerization is referred to as "curing".

Since there are many applications of UV cured polymers wherein the polymer is applied in only a small spot, there have been developed UV spot curing systems. These systems typically include a source of high intensity UV light which may be turned on and off by the operator and a flexible light guide which emits a small spot of UV light. The free end of the flexible light guide is positioned close to the applied monomer, and the power to the UV light source is turned on to initiate the photochemical curing polymerization process.

As UV spot curing has evolved, it has become increasingly important to establish a method of measuring system performance. Degradation of UV lamps, light guides, and reflectors can cause decreases in UV intensity and create curing problems. If the intensity of the UV light falls below a certain level, curing may not be complete resulting in a weak joint or attachment. Moreover, a visual inspection will not reveal the problem as the surface of the monomer spot may polymerize but the interior volume will not. It has therefore become mandatory, in certain applications to periodically measure the UV energy output of the spot curing system in order to insure that a sufficient UV intensity, is being delivered to the spot where curing is desired. However, such measurements are typically not conveniently made by current UV intensity measuring instruments and, due to the high output intensities of some spot curing systems, there is a risk that the output energy of the spot curing system will damage the measuring instrument.

SUMMARY OF THE INVENTION

It is therefore an object of the present invention to provide the operator of a UV spot curing system with instant feedback as to the performance of a spot curing system.

According to the invention, there is provided a self-contained, electro-optic instrument designed to measure and display the intensity emitted by a UV spot curing system. The instrument is a portable, battery-operated device which, in the preferred embodiment, has the size and shape of a flashlight. The measurement head receives various light guide adapters to provide a proper fit for a light guide of the UV spot curing system being used. In operation, the instrument is gripped in one hand while the light guide is inserted in the adapter in the measurement head with the other hand. Once the spot curing system's light guide is inserted, a start switch on the body of the instrument is depressed and a measurement is taken. When the start switch is released, the measurement temporarily stored and displayed on a display, such as a liquid crystal display (LCD).

The instrument is capable of measuring very high intensities of UV energy (up to 19.99 $W/cm^2$ in a preferred implementation) without damage to the instrument. This is made possible by an attenuator plate between the light guide adapter and the input optics. The attenuator plate is provided with a very small hole or holes, the number and size of which depends the attenuation ratio desired. In a preferred implementation of the invention, the attenuation ratio is 100:1. In addition, the instrument can be configured to read one of the following UV bandwidths commonly used in spot curing systems: 250-260 nm, 280-320 nm, 320-390 nm, or 395-445 nm.

The basic UV intensity. meter may be enhanced by providing a microprocessor and, optionally, a nonvolatile memory and clock. The addition of a microprocessor allows additional functions to be programmed into the instrument including an integration of intensity as a function of time to provide a readout of UV energy. By the further addition of the nonvolatile memory and clock, it is possible to record time stamped intensity measurements made by the operator. This data can then be read out and analyzed at a later time for quality control purposes.

While the instrument was originally designed for the specific purpose of measuring relatively high intensity UV light, as is generated by spot curing systems, the compact design and portability of instrument lends itself to a other diverse applications. One such application is the measurement of UV from relatively low level sources for purposes of monitoring environmental safety of workers. As will be described in more detail in the description of the preferred embodiment of the invention, this can be easily accomplished with but minor modification of the instrument.

Therefore, it is another object of the invention to provide a portable UV intensity meter which may be conveniently used for environmental safety testing.

BRIEF DESCRIPTION OF THE DRAWINGS

The foregoing and other objects, aspects and advantages will be better understood from the following derailed description of a preferred embodiment of the invention with reference to the drawings, in which:

FIG. 2 is an exploded view, partly in cross-section, of the measurement head of the instrument shown in FIG. 1;

FIG. 2A is a cross-sectional view of an alternate fisheye lens insert for use in the measurement head of FIG. 2:

DETAILED DESCRIPTION OF A PREFERRED EMBODIMENT OF THE INVENTION

Figure 1A:
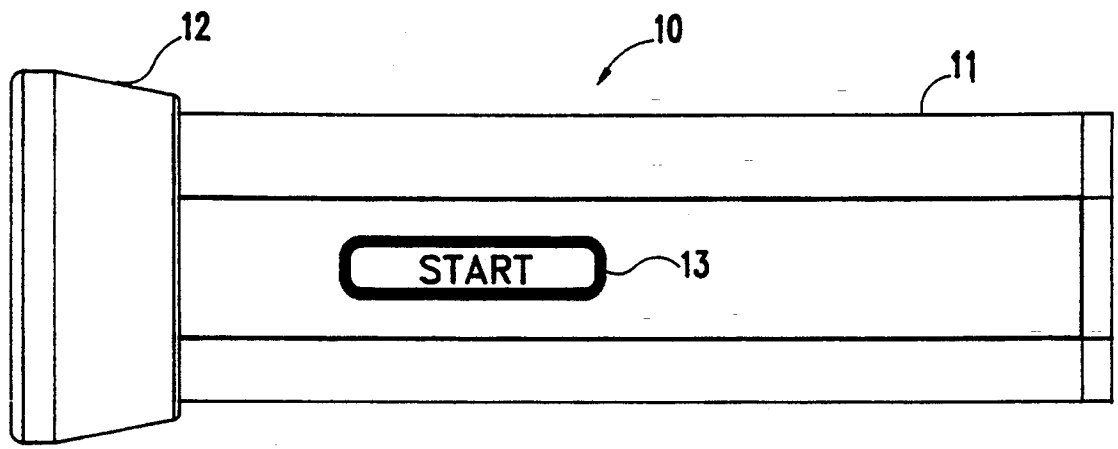
FIGS. 1A and 1B are side elevations drawing of the preferred embodiment of the invention.
Figure 1B:
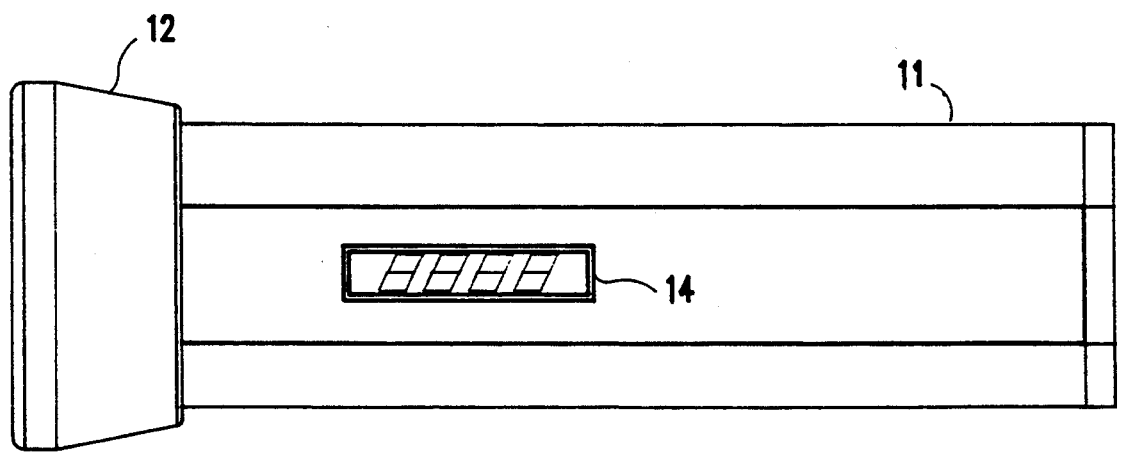

Referring now to the drawings, and more particularly to FIG. 1A, there is shown a side elevation of the instrument 10 according to a preferred embodiment of the invention. As shown, the instrument 10 has a shape similar to that of a conventional flashlight and comprises a generally cylindrical body 11 and a measurement head 12. Preferably, the body 11 has a non-circular cross-section, such as a variant of an octagon, in order to prevent the instrument from rolling when placed on a surface near the operator. The measurement head 12, shown in more detail in FIG. 2, is provided in its face with an adapter to receive the light guide from the UV spot curing system. The operator typically holds the body 11 of the instrument in one hand and, with the other hand, inserts the light guide in the measurement head 12. Then, the UV spot curing system is activated to generate its energy at the output end of the light guide and, at the same time, the start button 13 is depressed by the thumb of the hand holding the body 11. Once the measurement has been taken, the reading is displayed on a display 14 conveniently located on an opposite or adjacent face of the body 11 from that of the start button 13, as shown in FIG. 1B. The reading is displayed for a period of perhaps two and one half minutes to allow the operator to read and note the measurement before continuing to operate the UV spot cure system.

FIG. 2 shows an exploded view of the measurement head 12. The principle component is a solid machined body 15 having a threaded recess 16 for receiving an adapter 17 having mating threads. The adapter 17 has a bore 18 having an internal diameter depending on the outside diameter of a light guide for the particular LW spot curing system for which the measurement is desired. To facilitate easy insertion of the light guide, the bore 18 is provided with a tapered counter bore 19 having a diameter which increases toward the face of the measurement head. The adapter 17 may be provided with diametrically opposed slots (not shown) in its face end to allow easy removal and replacement with a screw driver or coin, thus allowing a single instrument to accommodate any diameter of light guide. At the base recess t 6 is groove 20 which receives an 0-ring (not shown) against which the adapter 17 abuts and into which the light guide is inserted to provide a substantially light-tight connection between the light guide and the measurement head.

Opposite recess 16 is concentric recess 21 and a communicating bore 22 providing a through passage from the face to the rear of the measurement head 12. At the base of recess 21 is a groove 23 which receives an 0-ring 24. Then, in successive order, there are inserted a diffuser window 25, one or more Teflon ® diffusers 26, an aperture plate 27 separated from the Teflon ® diffuser 26 by an O-ring 28, a cut glass filter 29, and finally a spacer 30. This assembly is kept in place by a plate 31 having a central projection 32 which mates with the spacer 30. The plate 31 fits within a recess 33 machined in the rear of the measurement head 12 and is secured by screws (not shown). The projection 32 has a through bore which receives the UV detector mounted on a detector board (not shown). The size (and number) of the hole or holes in the aperture plate controls the amount of the UV light which reaches the UV detector.

The aperture plate 27, which performs the function of a simple but effective optical attenuator, makes it possible to measure the intensity of very high output UV sources without damaging the UV detector. Such high output UV sources are characteristic of spot curing systems, for example, but for those applications where relatively low levels of UV light intensities are to be measured, the aperture plate 27 may be omitted.

One application where the aperture plate 27 is omitted is for environmental safety testing. The instrument is provided with a fisheye (i.e., very wide angle) lens adapter as shown in FIG. 2A. This adapter replaces the adapter 17 shown in FIG. 2 and comprises a body 34 having threads that mate with the threads of recess 16. However, the body 34 contains a fisheye lens, typically comprising a spherical focussing lens 35 and a correcting meniscus lens 36, to focus UV light over a wide angle onto the detector in projection 32.

Figure 3:
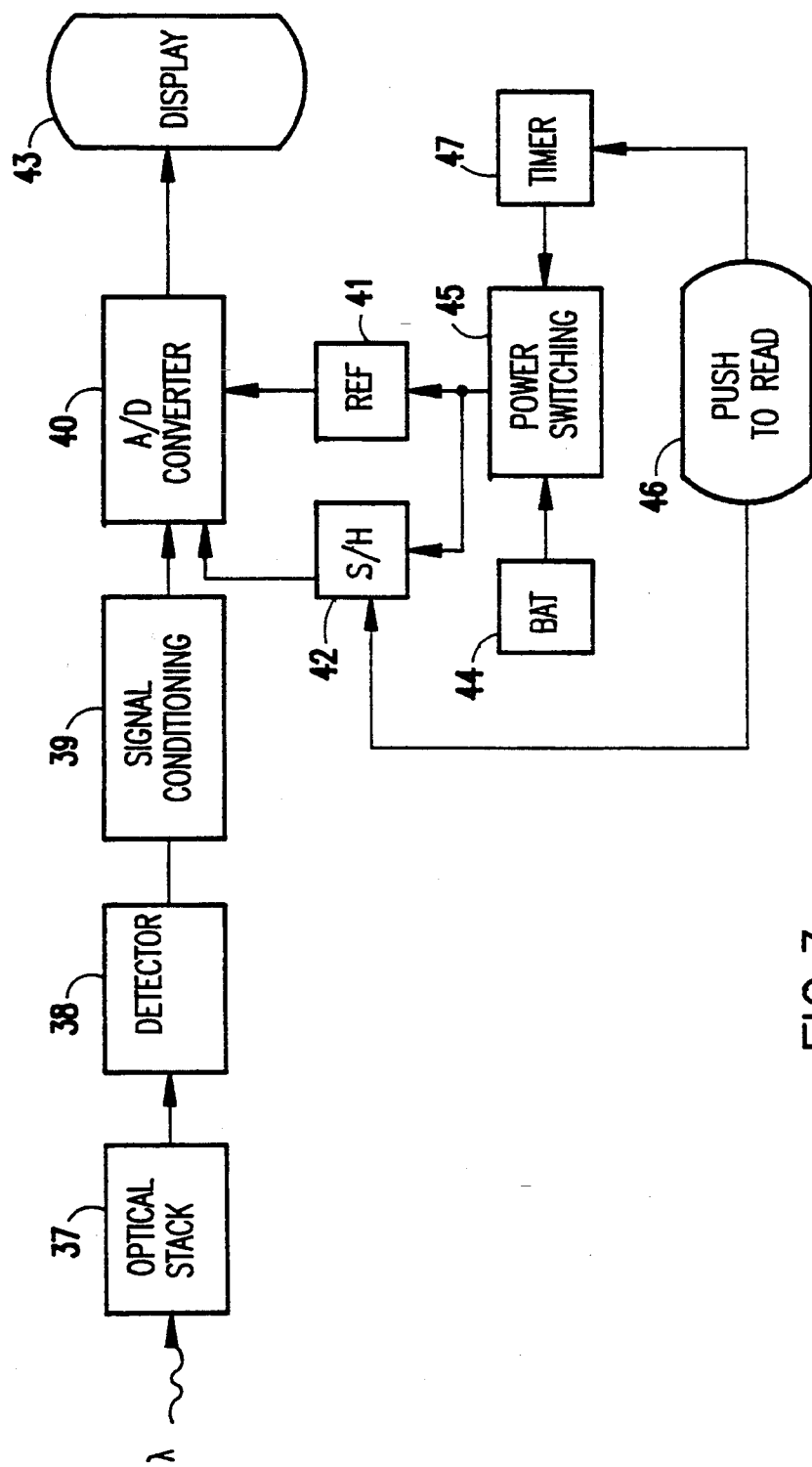
FIG. 3 is a block diagram of the basic circuit of the preferred embodiment of the invention.

FIG. 3 shows the basic detector circuit. UV light enters the optical stack 37, comprising the components of the optical head 12 shown in FIG. 2 and/or 2A. and enters the detector 38 housed in projection 32. The detector 38 generates an electrical signal output proportional to the intensity of the UV light string it. This electrical signal is input to signal conditioning circuitry 39. The signal conditioning circuitry is of conventional design and includes, among other components, a level adjusting voltage divider and may additionally include an isolation or buffer amplifier. The output of the signal conditioning circuitry 39 is input to an analog-to-digital (A/D) converter 40. The A/D converter uses an input reference voltage from A/D reference 41 to convert the input analog signal to a digital value. This digital value is temporarily stored by sample-and-hold (S/H) circuit 42. The output of the A/D converter 40 as held in S/H circuit 42 is supplied to a display 43, such as an LCD.

The A/D converter 40 is of conventional design and may be implemented with a commercially available integrated circuit (IC) device, such as the MAX136 A/D converter manufactured by Maxim Integrated Products. This device incorporates the S/H circuit 42 so that only a single IC is required for both the A/D converter 40 and S/H circuit 42.

To complete the description of FIG. 3, there is further provided a battery 44 connected to a power switching circuit 45. Normally, no power is supplied to the circuit in order to conserve the power of battery 44. However, when the switch 13 (shown in FIG. 1A) is pressed, the push to read circuit 46 detects this, activating timer 47 and S/H circuit 42. The timer 47 causes the power switching circuit 46 to temporarily supply power to the circuit so that a measurement is made, sampled and displayed. After a predetermined period of time, as determined by timer 47, the power switching circuit reverts to a no power condition, blanking display 43.

The circuit shown in FIG. 3 is quite sufficient for many applications where a simple intensity measurement is all that is required and where it is not necessary to generate a record of the measurements made. There are certain other applications where, in addition to an intensity measurement, it is desired to measure LrV energy and/or generate a time stamped record of measurements made. Such measurements and data records are possible with the modification of the basic device shown in FIG. 4, to which reference is now made.

Figure 4:
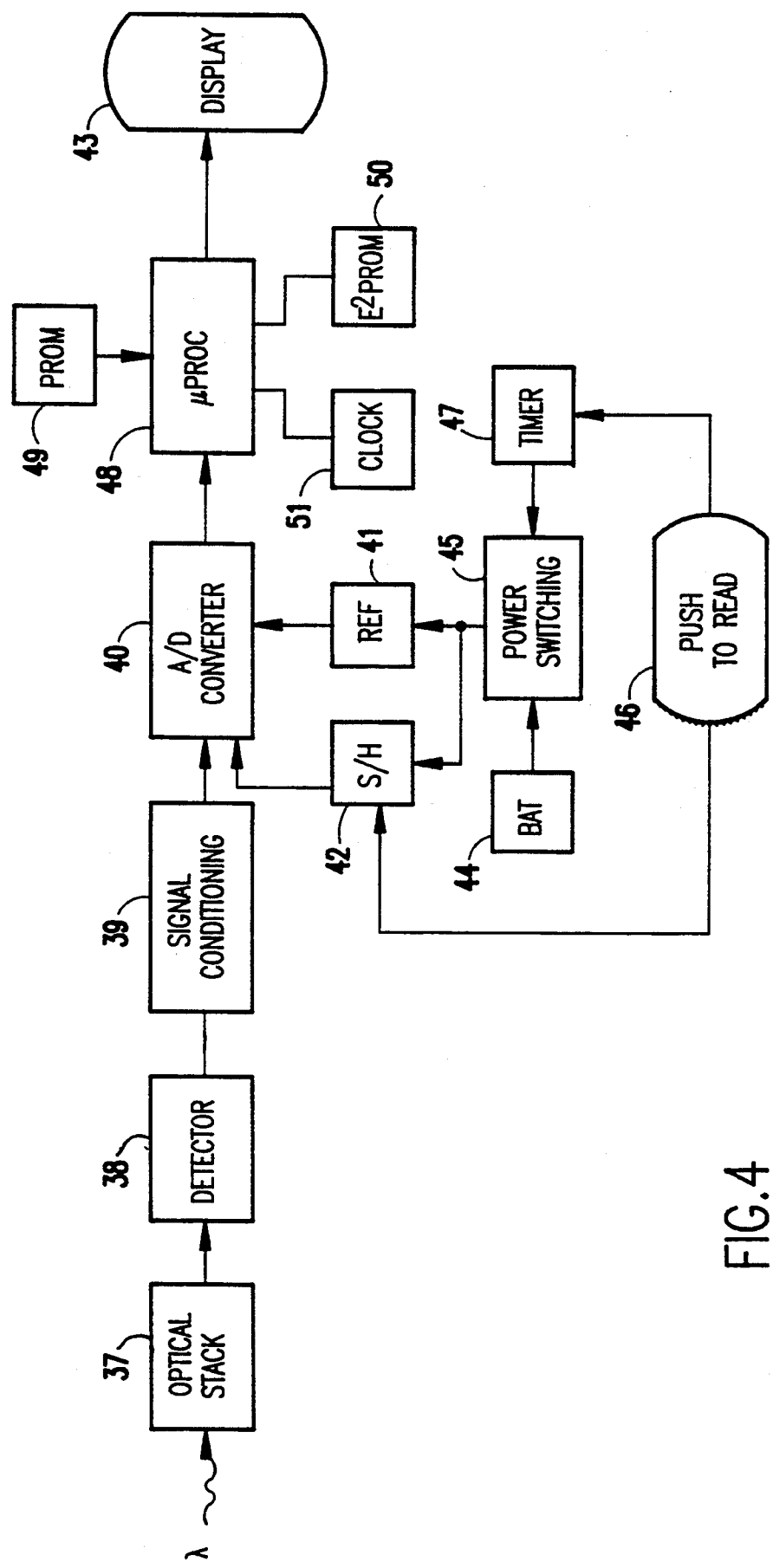
FIG. 4 is a block diagram of the basic circuit enhanced with the addition of a microprocessor, nonvolatile memory and clock to provide additional programmable function and for use in quality control analysis.

FIG. 4 is a block diagram showing an enhancement to the basic circuit. In this figure, the same components are indicated with identical reference numerals and will not be further described. The output of A/D converter 40, instead of being supplied directly to display 43, is supplied to a microprocessor 48 controlled by a program stored in a Programmable Read Only Memory (PROM) 49. The program, for example, may cause the microprocessor 48 to activate the display 43 to first display the measured intensity of the UV light and then, after a predetermined time or in response to a second activation of the push to read circuit 46, display the UV energy. The UV energy is an integration of the intensity measurement over a period of time.

In addition to the microprocessor 48 and the program PROM 49, the enhanced circuit may include a nonvolatile memory 50, such as an Electronically Erasable and Programmable Read Only Memory (E²PROM), and a real time clock 51. The program stored in PROM 49 causes the microprocessor 48 to format and store data corresponding to each measurement made with the instrument with a time stamp derived from clock 51 in the E²PROM 50. This record may be downloaded periodically to provide a Permanent record of measurements made. For example, where the instrument is used in a Production situation with a spot curing system, such a record may be advantageously used for quality control. Where the instrument is used in environmentally safety testing, such a record may be used to document the level of UV light measured in a work place.

While the invention has been described in terms of preferred embodiments with various modifications, those skilled in the art will recognize that the invention can be Practiced with modification within the spirit and scope of the appended claims.

Having thus described our invention, what we claim as new and desire to secure by Letters Patent is as follows:

1. An ultraviolet intensity meter comprising a generally cylindrical body and a measuring head secured to one end of the cylindrical body, said measuring head having a recess, an adapter within said recess for receiving a light guide which emits a spot of ultraviolet energy, said communicating said ultraviolet energy to an ultraviolet detector within the meter body through a diffuser window and an attenuator plate said body containing an electronic circuit responsive to an output of said ultraviolet detector and a battery for powering the electronic circuit, said body having a switch, on an exterior surface thereof and connected to the electronic circuit for turning the circuit on for making a measurement, and a numerical display, also on an exterior surface thereof and connected to the electronic circuit for displaying a measured level of ultraviolet intensity.

2. The ultraviolet intensity meter recited in claim 1 wherein said electronic circuit comprises:
   an analog-to-digital converter connected to receive an analog signal from said ultraviolet detector and generate a digital value proportional to said analog signal;
   said numerical display being operatively connected to said analog-to-digital converter for displaying said digital value.

3. The ultraviolet intensity meter recked in claim 2 wherein said electronic circuit further comprises:
   timed power switching means responsive to said switch for supplying power to said electronic circuit for a predetermined period of time after actuation of said switch; and
   a sample and hold circuit responsive to said switch and connected to said analog-to-digital circuit to hold said digital value for said predetermined period of time, said digital value being displayed by said numerical display until said predetermined period of time expires.

4. The ultraviolet intensity meter recited in claim 1 wherein said aperture plate has at least one aperture having a size designed to limit ultraviolet light to a level less than a maximum level which would damage said ultraviolet detector.

5. The ultraviolet intensity meter recited in claim 4 wherein said electronic circuit comprises:
   an analog-to-digital converter connected to receive an analog signal from said ultraviolet detector and generate a digital value proportional to said analog signal;
   said numerical display being operatively connected to said analog-to-digital converter for displaying said digital value.

6. The ultraviolet intensity meter recited in claim 5 wherein said electronic circuit further comprises:
   timed power switching means responsive to said switch for supplying power to said electronic circuit for a predetermined period of time after actuation of said switch; and
   a sample and hold circuit responsive to said switch and connected to said analog-to-digital circuit to hold said digital value for said predetermined period of time, said digital value being displayed by said numerical display until said predetermined period of time expires.

7. The ultraviolet intensity meter recited in claim 5 wherein said electronic circuit further comprises:
   a microprocessor connected to said analog-to-digital converter and supplying a formatted control output to said numerical display; and
   a memory storing a control program connected to said microprocessor, said control program causing said microprocessor to calculate the level of ultraviolet intensity by integrating ultraviolet energy received by said ultraviolet detector over a period or time, said microprocessor further controlling said numerical display to display said calculated level of ultraviolet.

8. The ultraviolet intensity meter recited in claim 5 wherein said electronic circuit further comprises:
   a microprocessor connected to said analog-to-digital converter and supplying a formatted control output to said numerical display;
   a memory storing a control program connected to said microprocessor;
   a real time clock generating a time output signal, said control program causing said microprocessor to format time stamped data corresponding to said digital value for each measurement made; and
   a nonvolatile memory connected to receive and store said time stamped data.

9. An ultraviolet intensity meter comprising:
   a measuring head having a recess, an adapter within said recess for receiving a light guide which emits a spot of ultraviolet energy, said adapter communicating with an ultraviolet detector through a diffuser window and an attenuator plate, said aperture plate having at least one aperture having a size designed to limit ultraviolet light to a level less than a maximum level which would damage said ultraviolet detector;
   an electronic circuit responsive to an output of said ultraviolet detector and including an analog-todigital converter connected to receive an analog signal from said ultraviolet detector and generate a digital value proportional to said analog signal; and a numerical display being operatively connected to said analog-to-digital converter for displaying said digital value.

10. The ultraviolet intensity meter recited in claim 9 further comprising:

a battery for powering the electronic circuit;

a switch connected to the electronic circuit for turning the circuit on for making a measurement;

timed power switching means responsive to said switch for supplying power to said electronic circuit for a predetermined period of time after actuation of said switch; and a sample and hold circuit responsive to said switch and connected to said analog-to-digital circuit to hold said digital value for said predetermined period of time, said digital value being displayed by said numerical display until said predetermined period of time expires.

11. The ultraviolet intensity meter recited in claim 9 wherein said electronic circuit further comprises:

a microprocessor connected to said analog-to-digital converter and supplying a formatted control output to said numerical display; and a memory storing a control program connected to said microprocessor, said control program causing said microprocessor to calculate said digital value by integrating ultraviolet light received by said ultraviolet detector over a period of time, said microprocessor further controlling said numerical display to display said calculated digital value.

12. The ultraviolet intensity meter recited in claim 9 wherein said electronic circuit further comprises:

a microprocessor connected to said analog-to-digital converter and supplying a formatted control output to said numerical display;

a memory storing a control program connected to said microprocessor;

a real time clock generating a time output signal, said control program causing said microprocessor to format time stamped data corresponding to said digital value for each measurement made; and a nonvolatile memory connected to receive and store said time stamped data.

13. An ultraviolet intensity meter comprising:

a measuring head having a recess, an adapter within said recess which includes a lens for receiving ultraviolet light and for focussing the received ultraviolet light on an ultraviolet detector;

an electronic circuit responsive to an output of said ultraviolet detector and including an analog-to-digital converter connected to receive an analog signal from said ultraviolet detector and generate a digital value proportional to said analog signal; and a numerical display being operatively connected to said analog-to-digital converter for displaying said digital value.

14. The ultraviolet intensity meter recked in claim 13 further comprising:

a battery for powering the electronic circuit;

a switch connected to the electronic circuit for turning the circuit on for making a measurement;

timed power switching means responsive to said switch for supplying power to said electronic circuit for a predetermined period of time after actuation of said switch; and a sample and hold circuit responsive to said switch and connected to said analog-to-digital circuit to hold said digital value for said predetermined period of time, said digital value being displayed by said numerical display until said predetermined period of time expires.

15. The ultraviolet intensity meter recited in claim 13 wherein said electronic circuit further comprises:

a microprocessor connected to said analog-to-digital converter and supplying a formatted control output to said numerical display; and a memory storing a control program connected to said microprocessor, said control program causing said microprocessor to calculate said digital value by integrating ultraviolet light received by said ultraviolet detector over a period of time, said microprocessor further controlling said numerical display to display said calculated digital value.

16. The ultraviolet intensity meter recited in claim 13 wherein said electronic circuit further comprises:

a microprocessor connected to said analog-to-digital converter and supplying a formatted control output to said numerical display;

a memory storing a control program connected to said microprocessor;

a real time clock generating a time output signal, said control program causing said microprocessor to format the stamped data corresponding to said digital value for each measurement made; and a nonvolatile memory connected to receive and store said time stamped data.

* * * * *